US011664947B2

(12) United States Patent
Lee et al.

(10) Patent No.: US 11,664,947 B2
(45) Date of Patent: May 30, 2023

(54) TECHNIQUES FOR ORTHOGONAL DEMODULATION REFERENCE SIGNALS

(71) Applicant: QUALCOMM Incorporated, San Diego, CA (US)

(72) Inventors: Heechoon Lee, San Diego, CA (US); Jing Jiang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/001,291

(22) Filed: Jun. 6, 2018

(65) Prior Publication Data

US 2018/0375629 A1    Dec. 27, 2018

Related U.S. Application Data

(60) Provisional application No. 62/525,066, filed on Jun. 26, 2017.

(51) Int. Cl.
*H04L 5/00* (2006.01)
*H04J 11/00* (2006.01)
(Continued)

(52) U.S. Cl.
CPC ......... *H04L 5/0051* (2013.01); *H04B 7/0452* (2013.01); *H04J 11/00* (2013.01);
(Continued)

(58) Field of Classification Search
CPC ... H04L 5/0051; H04L 5/0007; H04L 5/0092; H04B 15/04; H04B 7/0452; H04J 11/00;
(Continued)

(56) References Cited

U.S. PATENT DOCUMENTS 8,693,971 B1 * 4/2014 Bal ............... H04B 7/0417
455/296
2013/0114522 A1 * 5/2013 Frenne ............ H04L 5/0094
370/329
(Continued)

OTHER PUBLICATIONS

Huawei., et al.: "DMRS for NR-PDCCH", 3GPP Draft; R1-1709950, 3rd Generation Partnership Project (3GPP), Mobile Competence Centre; 650 Route Des Lucioles; F-06921 Sophia-Antipolis Cedex; France, vol. RAN WG1, No. Qingdao, China; Jun. 27, 2017-Jun. 30, 2017, Jun. 17, 2017 (Jun. 17, 2017), XP051304690, 9 pages, Retrieved from the Internet: URL: http://www.3gpp.org/ftp/tsg_ran/WG1_RL1/TSGR1 Ah/NR AH 1706/Docs/ [retrieved on-Jun. 17, 2017].
(Continued)

*Primary Examiner* — Yu-Wen Chang
(74) *Attorney, Agent, or Firm* — Arent Fox, LLP

(57) ABSTRACT

Various aspects described herein relate to techniques for using orthogonal demodulation reference signals (DMRSs) for downlink control channels in wireless communications systems. In an aspect, a method for a user equipment (UE) includes receiving one or more DMRSs over a multi-symbol downlink control channel. The method may further include identifying a time-first control channel element (CCE)-to-resource element group (REG) mapping for the multi-symbol downlink control channel, and identifying an orthogonal DMRS of the one or more DMRSs based on the time-first CCE-to-REG mapping, and decoding the multi-symbol downlink control channel based on at least the identified orthogonal DMRS.

24 Claims, 6 Drawing Sheets

(51) Int. Cl.
*H04B 7/0452* (2017.01)
*H04W 72/04* (2023.01)

(52) U.S. Cl.
CPC ............ *H04J 2011/0006* (2013.01); *H04J 2011/0009* (2013.01); *H04J 2011/0013* (2013.01); *H04L 5/0007* (2013.01); *H04L 5/0092* (2013.01); *H04W 72/042* (2013.01)

(58) Field of Classification Search
CPC ....... H04J 2011/0009; H04J 2011/0006; H04J 2011/0013; H04W 72/042
See application file for complete search history.

(56) References Cited

U.S. PATENT DOCUMENTS

| | | | | |
|---|---|---|---|---|
| 2014/0086176 | A1* | 3/2014 | Liu | H04W 72/082 370/329 |
| 2015/0263796 | A1* | 9/2015 | Nam | H04B 7/0452 370/329 |
| 2016/0338046 | A1 | 11/2016 | Chen et al. | |
| 2017/0366377 | A1* | 12/2017 | Papasakellariou | H04L 1/0026 |
| 2018/0026684 | A1* | 1/2018 | Wei | H04B 7/0452 370/329 |
| 2018/0279135 | A1* | 9/2018 | Hwang | H04L 1/1861 |
| 2018/0279354 | A1* | 9/2018 | Nory | H04L 5/0064 |
| 2018/0310290 | A1* | 10/2018 | Shimezawa | H04L 5/0044 |
| 2018/0316534 | A1* | 11/2018 | Shin | H04L 5/0048 |
| 2018/0368116 | A1* | 12/2018 | Liao | H04W 76/27 |
| 2019/0103941 | A1* | 4/2019 | Seo | H04L 1/00 |
| 2019/0165904 | A1* | 5/2019 | Jo | H04W 72/042 |
| 2019/0387514 | A1* | 12/2019 | Horiuchi | H04W 72/044 |
| 2020/0021410 | A1* | 1/2020 | Choi | H04L 5/0007 |
| 2020/0068540 | A1* | 2/2020 | Wang | H04L 5/0051 |
| 2021/0144038 | A1* | 5/2021 | Davydov | H04B 7/0452 |
| 2021/0160024 | A1* | 5/2021 | Gao | H04L 27/2613 |
| 2021/0218515 | A1* | 7/2021 | Yl | H04W 72/0446 |

OTHER PUBLICATIONS

Intel Corporation: "On DM-RS design for NR PDCCH", 3GPP Draft; R1-1710542 DMRS Design for PDCCH, 3rd Generation Partnership Project (3GPP), Mobile Competence Centre, 650, Route Des Lucioles, F-06921, Sophia-Anti Polls Cedex, France, vol. RAN WG1, No. Qingdao, P.R. China; Jun. 27, 2017-Jun. 30, 2017, Jun. 17, 2017 (Jun. 17, 2017), XP051305113, 5 pages, Retrieved from the Internet: URL: http://www.3gpp.org/ftp/tsg_ran/WG1_RL1/TSGR1 AH/NR AH 1706/Docs/.

International Search Report and Written Opinion—PCT/US2018/036513—ISA/EPO—dated Sep. 10, 2018.

Samsung: "DMRS Structure for PDCCH", 3GPP Draft; R1-1711583, DMRS Structure for PDCCH, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017, Jun. 23, 2017 (Jun. 23, 2017), XP051305839, 6 pages, Retrieved from the Internet: URL: http://www.3gpp.org/ftp/tsg_ran/WG1_RL1/TSGR1_AH/NR_AH_1706/Docs/ [retrieved on-Jun. 23, 2017].

* cited by examiner

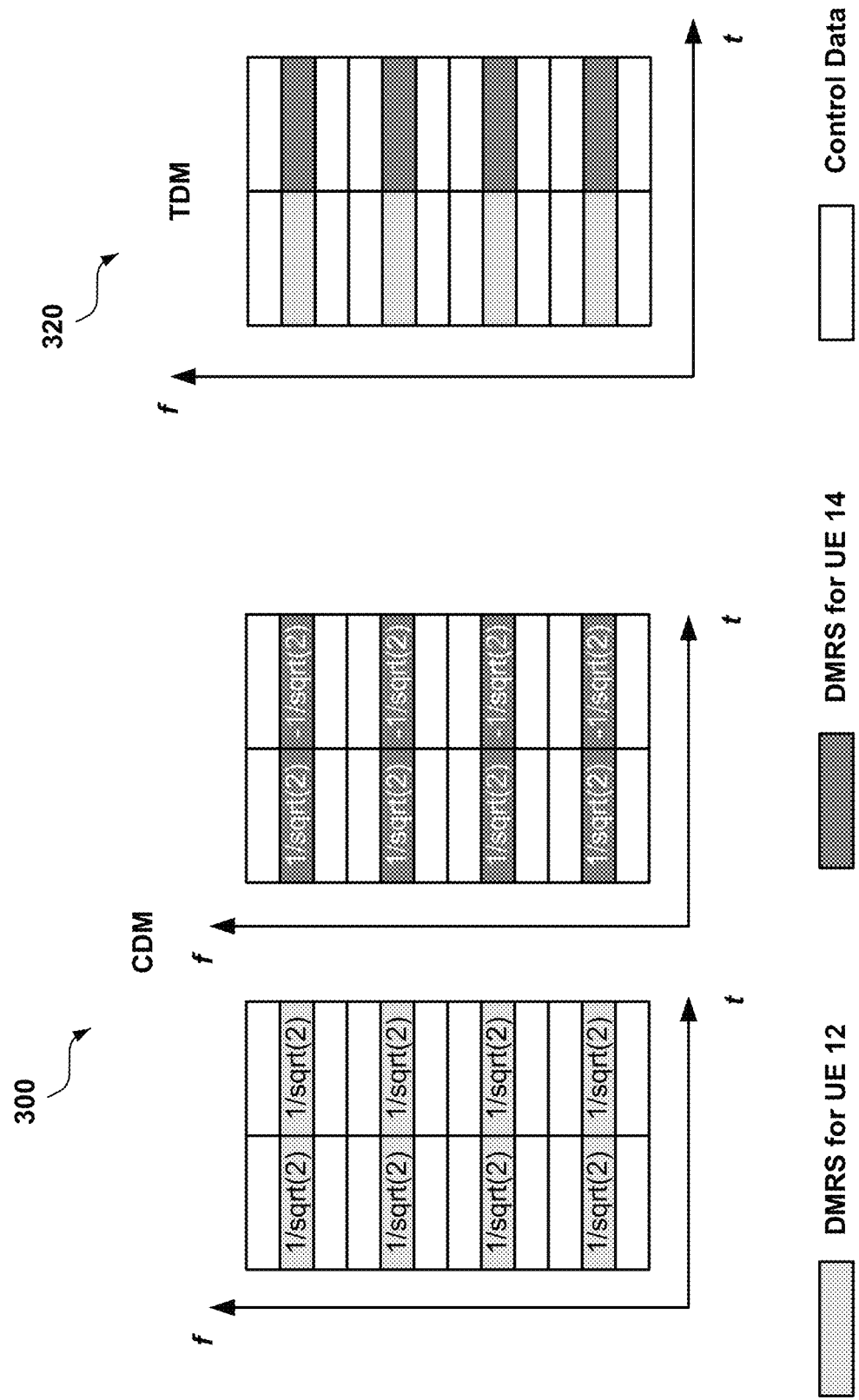

TECHNIQUES FOR ORTHOGONAL DEMODULATION REFERENCE SIGNALS

CROSS-REFERENCE TO RELATED APPLICATION

This application claims the benefit of U.S. Provisional Application Ser. No. 62/525,066, entitled "ORTHOGONAL DMRS FOR CONTROL CHANNELS" and filed on Jun. 26, 2017, which is expressly incorporated by reference herein in its entirety.

BACKGROUND

Aspects of the present disclosure relate generally to wireless communications systems, and more particularly, to techniques and schemes for orthogonal demodulation reference signals (DMRSs) for control channels in wireless communications systems (e.g., a 5G New Radio system).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase.

The 5th Generation (5G) New Radio (NR) communications technology, used in a wide range of spectrum, is envisaged to expand and support diverse usage scenarios and applications with respect to current mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information. As the demand for mobile broadband access continues to increase, there exists a need for further improvements in 5G communications technology and beyond. Preferably, these improvements should be applicable to other multi-access technologies and the telecommunication standards that employ these technologies.

Accordingly, due to the requirements for increased data rates and higher capacity, new approaches may be desirable to improve resource utilization and spectral efficiency by using orthogonal DMRSs for downlink control channels (e.g., a multi-user multiple-input multiple-output (MU-MIMO) downlink control channel), in order to enhance modulation, waveform and air-interface design, to satisfy consumer demand, and to improve user experience in wireless communications, e.g., 5G NR communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

According to an example, a first method related to using orthogonal demodulation reference signals (DMRSs) for downlink control channels in a wireless communications system is provided. In an aspect, the method may include receiving one or more DMRSs over a multi-symbol downlink control channel. The method may further include identifying a time-first control channel element (CCE)-to-resource element group (REG) mapping for the multi-symbol downlink control channel, identifying an orthogonal DMRS of the one or more DMRSs based on the time-first CCE-to-REG mapping, and decoding the multi-symbol downlink control channel based on at least the identified orthogonal DMRS.

In another aspect, an apparatus (e.g., a user equipment (UE)) for wireless communications is provided that includes a transceiver, a memory configured to store instructions, and one or more processors communicatively coupled with the receiver and the memory. For example, the one or more processors may be configured to execute the instructions to receive, via the transceiver, one or more DMRSs over a multi-symbol downlink control channel, identify a time-first CCE-to-REG mapping for the multi-symbol downlink control channel, identify an orthogonal DMRS of the one or more DMRSs based on the time-first CCE-to-REG mapping, and decode the multi-symbol downlink control channel based on at least the identified orthogonal DMRS.

In yet another aspect, an apparatus (e.g., a UE) for wireless communications is provided that includes means for receiving one or more DMRSs over a multi-symbol downlink control channel, means for identifying a time-first CCE-to-REG mapping for the multi-symbol downlink control channel, means for identifying an orthogonal DMRS of the one or more DMRSs based on the time-first CCE-to-REG mapping, and means for decoding the multi-symbol downlink control channel based on at least the identified orthogonal DMRS.

In yet another aspect, a computer-readable medium (e.g., a non-transitory computer-readable medium) storing code executable by at least one processor for wireless communications and comprising code for receiving one or more DMRSs over a multi-symbol downlink control channel, code for identifying a time-first CCE-to-REG mapping for the multi-symbol downlink control channel, code for identifying an orthogonal DMRS of the one or more DMRSs based on the time-first CCE-to-REG mapping, and code for decoding the multi-symbol downlink control channel based on at least the identified orthogonal DMRS.

In another aspect, a second method related to using orthogonal DMRSs for downlink control channels in a wireless communications system is provided. For example, the method may include identifying a time-first CCE-to-REG mapping for a multi-symbol downlink control channel, generating one or more orthogonal DMRSs based on the time-first CCE-to-REG mapping, and transmitting the one or more orthogonal DMRSs over the multi-symbol downlink control channel.

In a further aspect, an apparatus for wireless communication is provided that includes a transceiver, a memory configured to store instructions, and one or more processors communicatively coupled with the transceiver and the memory. The one or more processors are configured to execute the instructions to identify a time-first CCE-to-REG mapping for a multi-symbol downlink control channel, generate one or more orthogonal DMRSs based on the time-first CCE-to-REG mapping, and transmit, via the transceiver, the one or more orthogonal DMRSs over the multi-symbol downlink control channel.

In another aspect, an apparatus for wireless communication is provided that includes means for identifying a time-first CCE-to-REG mapping for a multi-symbol downlink control channel, means for generating one or more orthogonal DMRSs based on the time-first CCE-to-REG mapping, and means for transmitting the one or more orthogonal DMRSs over the multi-symbol downlink control channel.

In yet another aspect, a computer-readable medium (e.g., a non-transitory computer-readable medium) is provided storing code executable by at least one processor for wireless communication and comprising code for identifying a time-first CCE-to-REG mapping for a multi-symbol downlink control channel, code for generating one or more orthogonal DMRSs based on the time-first CCE-to-REG mapping, and code for transmitting the one or more orthogonal DMRSs over the multi-symbol downlink control channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

FIG. 3A illustrates an example of orthogonal DMRSs using a CDM scheme, and an example of orthogonal DMRSs using a TDM scheme, on a 2-symbol control channel, according to one or more of the presently described aspects.

DETAILED DESCRIPTION

Figure 1:
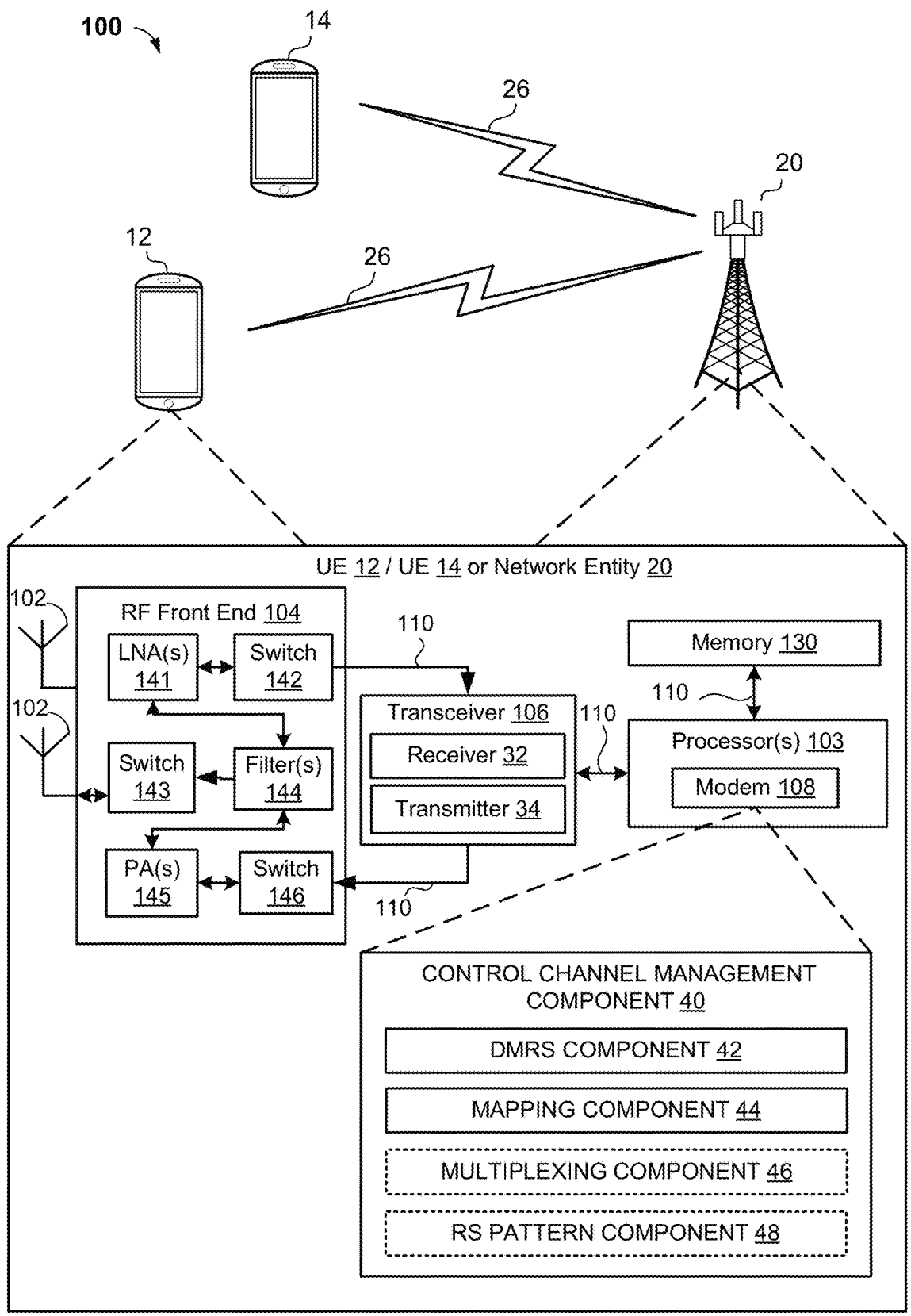
FIG. 1 is a block diagram illustrating an example of a wireless communications system (e.g., a 5G NR system) including one or more user equipments (UEs) and a base station (e.g., a gNB) for using orthogonal demodulation reference signals (DMRSs) for downlink control channels, according to one or more of the presently described aspects.

In a wireless communications system (e.g., a 5G NR system), non-orthogonal demodulation reference signals (DMRSs) may be used for downlink control channels, and no standard specification may be impacted. In some implementations, space division multiple access (SDMA) may be used for non-orthogonal DMRSs for one or more multi-user multiple-input multiple-output (MU-MIMO) downlink control channels (e.g., a physical downlink control channel (PDCCH)). In some aspects, orthogonal DMRSs for a MU-MIMO downlink control channel may encounter high signal overhead. For example, when using orthogonal DMRSs in a symbol via frequency division multiplexing (FDM), two third (or around 67%) of the symbol may be overhead, assuming each orthogonal DMRS occupies one third (or around 33%) of the resource elements and two orthogonal DMRSs are used. As such, it is desirable to reduce the overhead of downlink control channels when allowing orthogonal DMRS support for downlink control channels (e.g., a MU-MIMO downlink control channel). In some examples, by using orthogonal DMRSs via FDM, code division multiplexing (CDM), and/or time division multiplexing (TDM) in multiple symbols, the overhead of a multi-symbol downlink control channel (e.g., a MU-MIMO downlink control channel) may be reduced without degrading channel estimation quality. In an aspect, channel estimation quality may be improved by using one or more orthogonal ports at a user equipment (UE) or orthogonal DMRSs for one or more UEs with a multi-symbol downlink control channel, compared to the case with a single-symbol downlink control channel.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. In some aspects, the computer-readable media may be non-transitory or include a non-transitory computer-readable storage medium.

Described herein are various aspects related to a wireless communications system (e.g., 5G NR system), in particular, techniques and schemes for using orthogonal DMRSs for control channels. In some aspects, orthogonal DMRS may be supported for MU-MIMO downlink control channel(s) (e.g., PDCCH). In some examples, a control resource set (CORESET), where a downlink control channel search space is defined, may be 1-symbol, 2-symbol, or 3-symbol length. In some aspects, for control channel element (CCE)-to-resource element group (REG) mapping for downlink control channels, frequency-first CCE-to-REG mapping may be used for 1-symbol CORESET. For multi-symbol CORESET, time-first CCE-to-REG mapping may be used. In some cases, frequency-first CCE-to-REG mapping may be allowed for multi-symbol CORESET. In some examples, at least one of localized mapping or distributed mapping is supported for CCE-to-REG mapping, or both localized mapping and distributed mapping are supported. In some cases, a distributed mapping may be in time or in frequency.

In some aspects, a reference signal (RS) pattern may be configured or indicated by the network (e.g., a base station or a gNB) or a UE. In some examples, the RS pattern may be front-loaded (e.g., first symbol only), may be for every symbol, or a subset of symbols in a downlink control channel.

In some aspects, a CCE may be defined by six (6) REGs, irrespective of the existence of RS within each REG. For example, a REG may be represented by:

1 REG=1 resource block(RB)(=12 subcarriers)×1 symbol

In some cases, a REG may be the base unit, and a CCE may be defined by or mapped to 6 REGs, for example, 2×3 REGs, 3×2 REGs, or 6×1 REGs in frequency and time, respectively.

In some aspects of 5G NR, orthogonal DMRS may be used for MU-MIMO downlink control. In some cases, orthogonal DMRS may be supported for MU-MIMO downlink control with time-first CCE-to-REG mapping, which may reduce overhead by maintaining RS overhead not more than the case with 1-symbol CORESET with frequency-first CCE-to-REG mapping.

In some cases, a MU-MIMO downlink control channel (e.g., PDCCH) may include multiple symbols, and each orthogonal RS or DMRS may be present on one of the symbols or multiple symbols, depending on the multiplexing scheme used or configured (e.g., CDM, TDM, or FDM).

In some examples, orthogonal DMRS may be achieved by CDM. Due to channel estimation averaging effect over multiple symbols, using CDM for a multi-symbol downlink control channel or a multi-symbol CORESET may achieve more accurate channel estimations, compared to using other multiplexing schemes. In an example, when using CDM for two orthogonal ports, each orthogonal port may have one or more symbols. In some cases, the ports are orthogonal by the code(s) used for the one or more symbols. For example, there are two orthogonal ports with each port having two symbols. In this case, one port may use the code $\{1, 1\}$ and the other port may use the code $\{1, -1\}$. In some cases, TDM or FDM may be used for generating or configuring orthogonal DMRS(s).

In some examples, up to 2 orthogonal ports or UEs may be supported. For example, in case of 3-symbol CORESET, orthogonal DMRS may be present on the first 2 symbols. In other words, a first orthogonal DMRS may be present on the first symbol on a downlink multi-symbol control channel, and a second orthogonal DMRS may be present on the second symbol on the downlink multi-symbol control channel. In another example, in case of 2-symbol or 3-symbol CORESET, an orthogonal DMRS may be present on at least the first symbol or the second symbol on a downlink multi-symbol control channel.

In some aspects, an orthogonal DMRS may be used for a single UE. In some cases, the orthogonal DMRS may be orthogonal to another DMRS that is used for another UE, or another DMRS that is used by another port of the single UE. In some examples, the orthogonal DMRS may be present on one symbol or multiple symbols on a downlink control channel (e.g., PDCCH).

In some examples, various aspects discussed herein related to techniques and schemes for using orthogonal DMRSs for downlink control channels may be used or applied to multi-panels, multi-ports, and/or multi-transmission reception points (TRPs) transmissions to a single UE. For example, orthogonal DMRSs for downlink control channels may be used in single-user (SU)-MIMO communications.

Each of the aspects described above are performed or implemented in connection with FIGS. 1-5, which are described in more detail below.

Referring to FIG. 1, in an aspect, a wireless communications system 100 includes at least one UE 12 or UE 14 in communication coverage of at least one network entity 20 (e.g., a base station or a gNB, or a cell thereof, in a 5G NR network). UE 12 and/or UE 14 may communicate with a network via the network entity 20. In some aspects, multiple UEs including at least the UE 12 and/or UE 14 may be in communication coverage with one or more network entities, including network entity 20. In an aspect, the network entity 20 may be a base station such a gNB in a 5G NR network. Although various aspects are described in relation to the 5G NR network, similar principles may be applied in other wireless wide area networks (WWAN). The wireless network may employ a scheme where multiple UEs may receive signals on a channel (e.g., an MU-MIMO downlink control channel). In an example, the UE 12 and/or UE 14 may transmit and/or receive wireless communications (e.g., wireless communications 26) to and/or from the network entity 20. For example, the UE 12 and/or UE 14 may be actively communicating with the network entity 20 via wireless communications 26.

In some aspects, UE 12 and/or UE 14 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 12 and/or UE 14 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things (IoT), or any other similar functioning device. Additionally, the network entity 20 may be a macrocell, picocell, femtocell, relay, Node B, mobile Node B, small cell box, UE (e.g., communicating in peer-to-peer or ad-hoc mode with the UE 12 and/or UE 14), or substantially any type of component that can communicate with the UE 12 and/or UE 14 to provide wireless network access to the UE 12 and/or UE 14.

According to the present aspects, the UE 12 and/or UE 14, or the network entity 20, may include one or more processors 103 and a memory 130 that may operate in combination with a control channel management component 40 to control a DMRS component 42, a mapping component 44, a multiplexing component 46, and/or an RS pattern component 48 for performing downlink control by supporting and using orthogonal DMRSs as described herein.

For example, the control channel management component 40 may be configured to perform downlink control. In an aspect, the term "component" as used herein may be one of the parts that make up a system, may be hardware, firmware, and/or software, and may be divided into other components. The control channel management component 40 may be communicatively coupled with a transceiver 106, which may include a receiver 32 for receiving and processing radio frequency (RF) signals (e.g., DMRSs) and a transmitter 34 for processing and transmitting RF signals (e.g., DMRSs). The processor 103 may be communicatively coupled with the transceiver 106 and memory 130 via at least one bus 110.

In some aspects, the control channel management component 40 may include the DMRS component 42, the mapping component 44, the multiplexing component 46, and/or the RS pattern component 48, for performing downlink control management and downlink communications. For example, the DMRS component 42 may be configured to transmit, receive, identify, generate, decode and/or manage one or more orthogonal DMRSs over a downlink control channel. In an example, the mapping component 44 may be configured to perform or identify the CCE-to-REG mapping (e.g., time-first or frequency-first CCE-to-REG mapping). In an example, the multiplexing component 46 may be configured to perform CDM, TDM, or FDM to assist orthogonal DMRS generation. In an aspect, the RS pattern component 48 may be configured to identify or deliver one or more RS patterns for DMRSs or downlink control channels.

The receiver 32 may include hardware, firmware, and/or software code executable by a processor for receiving data, the code comprising instructions and being stored in a memory (e.g., computer-readable medium, or non-transitory computer-readable storage medium). The receiver 32 may be, for example, an RF receiver. In an aspect, the receiver 32 may receive signals transmitted by UE 12 and/or UE 14 or network entity 20. The receiver 32 may obtain measurements of the signals. For example, the receiver 32 may determine Ec/Io, SNR, etc.

The transmitter 34 may include hardware, firmware, and/or software code executable by a processor for transmitting data, the code comprising instructions and being stored in a memory (e.g., computer-readable medium). The transmitter 34 may be, for example, a RF transmitter.

In an aspect, the one or more processors 103 may include a modem 108 that uses one or more modem processors. The various functions related to the control channel management component 40 may be included in modem 108 and/or processors 103 and, in an aspect, may be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement components included in the control channel management component 40, including the DMRS component 42, the mapping component 44, the multiplexing component 46, and/or the RS pattern component 48.

The control channel management component 40, the DMRS component 42, the mapping component 44, the multiplexing component 46, and/or the RS pattern component 48 may include hardware, firmware, and/or software code executable by a processor for performing random access management and operations. For example, the hardware may include, for example, a hardware accelerator, or specialized processor.

Moreover, in an aspect, the UE 12 and/or UE 14 may include an RF front end 104 and transceiver 106 for receiving and transmitting radio transmissions, for example, wireless communications 26. For example, transceiver 106 may receive a downlink signal that includes one or more orthogonal DMRSs for the UE 12 and/or other UEs (e.g., the UE 14). Depending on the UE behavior discussed herein, the transceiver 106 may transmit an uplink signal to the network entity 20. For example, transceiver 106 may communicate with modem 108 to transmit messages generated by the control channel management component 40 and/or to receive messages and forward them to control channel management component 40.

RF front end 104 may be connected to one or more antennas 102 and may include one or more low-noise amplifiers (LNAs) 141, one or more switches 142, 143, 146, one or more power amplifiers (PAs) 145, and one or more filters 144 for transmitting and receiving RF signals. In an aspect, components of RF front end 104 may connect with transceiver 106 (e.g., via one or more buses 110). Transceiver 106 may connect to one or more modems 108 and processor 103.

In an aspect, the LNA 141 may amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application. In an aspect, the RF front end 104 may provide measurements (e.g., Ec/Io) and/or applied gain values to the control channel management component 40.

Further, for example, one or more PA(s) 145 may be used by the RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and a specified gain value based on a desired gain value for a particular application.

Also, for example, one or more filters 144 may be used by the RF front end 104 to filter a received signal to obtain an input RF signal. Similarly, in an aspect, for example, a respective filter 144 may be used to filter an output from a respective PA 145 to produce an output signal for transmission. In an aspect, each filter 144 may be connected to a specific LNA 141 and/or PA 145. In an aspect, RF front end 104 may use one or more switches 142, 143, 146 to select a transmit or receive path using a specified filter 144, LNA, 141, and/or PA 145, based on a configuration as specified by transceiver 106 and/or processor 103.

Transceiver 106 may be configured to transmit and receive wireless signals through an antenna 102 via the RF front end 104. In an aspect, the transceiver may be tuned to operate at specified frequencies such that the UE 12 and/or UE 14 can communicate with, for example, the network entity 20. In an aspect, for example, the modem 108 may configure the transceiver 106 to operate at a specified frequency and power level based on the UE configuration of the UE 12 and/or UE 14 and communication protocol used by modem 108.

In an aspect, the modem 108 may be a multiband-multimode modem, which may process digital data and communicate with the transceiver 106 such that the digital data is sent and received using the transceiver 106. In an aspect, the modem 108 may be multiband and be configured to support multiple frequency bands for a specific communications protocol. In an aspect, the modem 108 may be multi-mode and be configured to support multiple operating networks and communications protocols. In an aspect, the modem 108 may control one or more components of the UE 12 and/or UE 14, or the network entity 20 (e.g., RF front end 104, transceiver 106) to enable transmission and/or reception of signals based on a specified modem configuration. In an aspect, the modem configuration may be based on the mode of the modem and the frequency band in use. In another aspect, the modem configuration may be based on UE configuration information associated with the UE 12 and/or UE 14 as provided by the network during cell selection and/or cell reselection.

The UE 12 and/or UE 14, or the network entity 20 may further include memory 130, such as for storing data used herein and/or local versions of applications, or control channel management component 40 and/or one or more of the subcomponents being executed by processor 103. The memory 130 may include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, the memory 130 may be a computer-readable storage medium that stores one or more computer-executable codes defining the control channel management component 40 and/or one or more subcomponents, and/or data associated therewith, when the UE 12, UE 14, or the network entity 20 is operating the processor 103 to execute the control channel management component 40 and/or one or more of the subcomponents of the control channel management component 40. In an aspect, for example, the memory 130 may be a non-transitory computer-readable storage medium.

Figure 2:
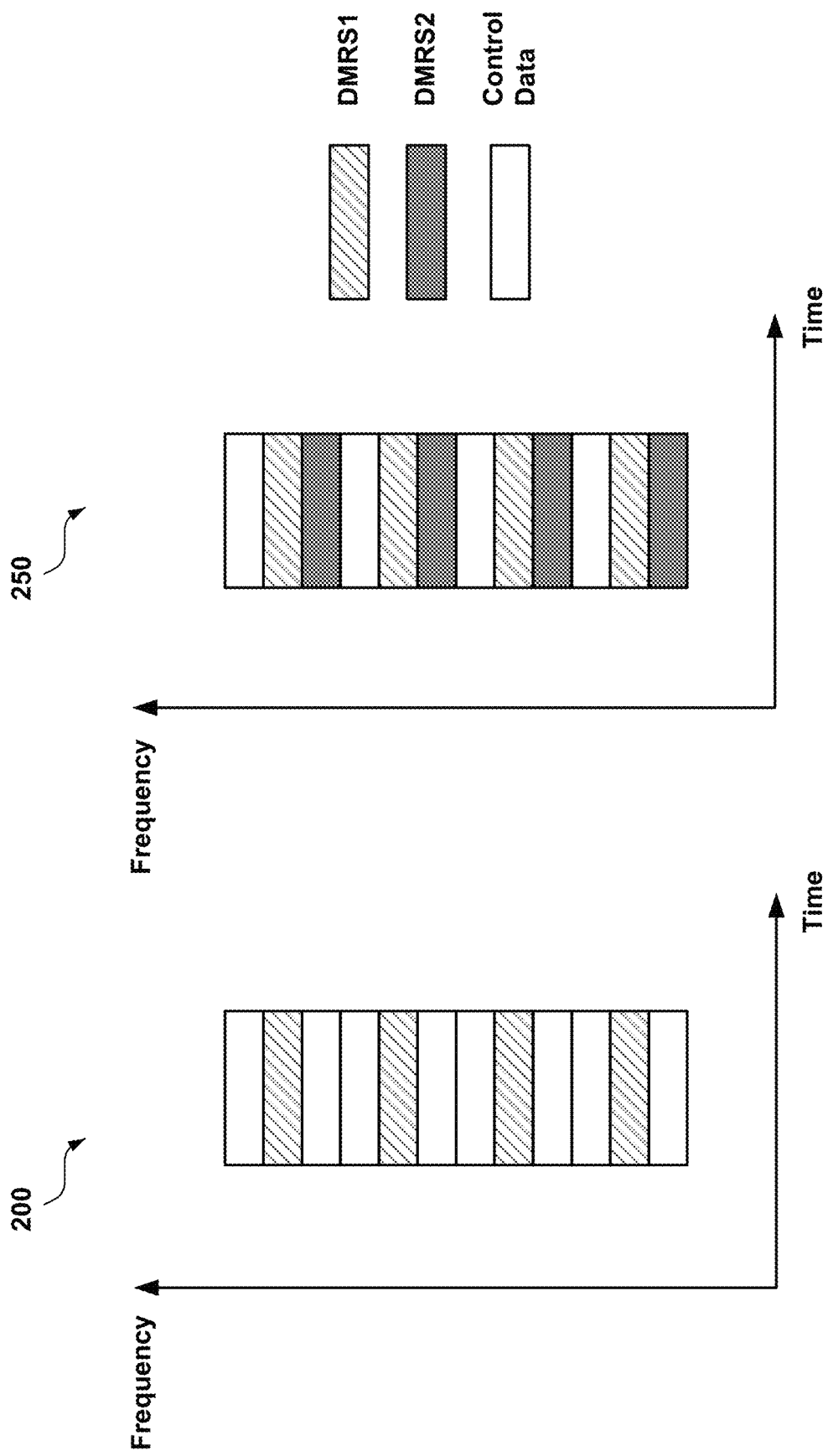
FIG. 2 illustrates two examples of DMRS used for control channels, according to one or more of the presently described aspects.

Referring to FIG. 2, two types of DMRS, non-orthogonal DMRS and orthogonal DMRS, on a downlink control channel (e.g., PDCCH) in a wireless communications system (e.g., a 5G NR system) are illustrated. In an aspect, for example, a symbol 200 may include a total of 12 subcarriers, of which 4 subcarriers may be used for non-orthogonal DMRS(s), and the remaining 8 subcarriers may be used for control data or information.

Still referring to FIG. 2, a symbol 250 may be used in a wireless communications system (e.g., a 5G NR system). In this example, by using FDM, two orthogonal DMRSs (e.g., DMRS1 and DMRS2) for a downlink control channel (e.g., a MU-MIMO downlink control channel) are included in 8 out of the 12 subcarriers within the symbol 250, and only 4 subcarriers are used for control data. Therefore, the overhead of the symbol 250 of the downlink control channel may encounter high overhead (e.g., two third or around 67% is overhead).

Referring to FIG. 3A, in an aspect, a MU-MIMO downlink control channel with at least 2 symbols for each UE (e.g., UE 12 or UE 14 in FIG. 1) may use a multiplexing scheme 300 in a wireless communications system (e.g., the wireless communications system 100 in FIG. 1). In an example, two DMRSs, one for UE 12 and one for UE 14, use CDM to achieve orthogonal DMRSs for the MU-MIMO downlink control channel. In particular, for example, the two DMRSs are orthogonal by the code(s) used for the two symbols. Accordingly, there are two orthogonal DMRSs, and each DMRS may be included in two symbols. In an example, the DMRS for UE 12 may use the code {1, 1} and the other DMRS for UE 14 may use the code {1, −1} as shown in FIG. 3A. In some cases, the DMRSs for UE 12 and UE 14 may use different codes to achieve orthogonal. In an aspect, the two UEs (or two orthogonal ports at a UE) using the multiplexing scheme 300 receive the MU-MIMO downlink control channel simultaneously.

In another example when using CDM, orthogonal DMRSs may be present in different subcarriers for each symbol of the multi-symbol downlink control channel (e.g., with different RS patterns). For instance, the orthogonal DMRSs for both UEs may be included in the $2^{nd}$, the $5^{th}$, the $8^{th}$, and the $11^{th}$ subcarrier of each symbol (as shown in FIG. 3A), or the orthogonal DMRSs may be included in the $3^{rd}$, the $6^{th}$, the $9^{th}$, and the $12^{th}$ subcarrier of each symbol (not shown in FIG. 3A).

In another aspect, a MU-MIMO downlink control channel may use a multiplexing scheme 320 in a wireless communications system (e.g., the wireless communications system 100 in FIG. 1). In an example, two DMRSs, one for UE 12, and one for UE 14 uses TDM to achieve orthogonal DMRSs for the MU-MIMO downlink control channel. In particular, for example, the two orthogonal DMRSs may use different time and/or be present in different symbols. In an example, the DMRS for UE 12 may be present in the first symbol of the multi-symbol downlink control channel, while the other DMRS for UE 14 may be present in the second symbol of the multi-symbol downlink control channel, as shown in FIG. 3A.

In another example when using TDM, orthogonal DMRSs may be present in different subcarriers for each symbol of the multi-symbol downlink control channel (e.g., with different RS patterns). For instance, the orthogonal DMRSs for both UEs may be included in the $2^{nd}$, the $5^{th}$, the $8^{th}$, and the $11^{th}$ subcarrier of each symbol (as shown in FIG. 3A), or the orthogonal DMRSs may be included in the $3^{rd}$, the $6^{th}$, the $9^{th}$, and the $12^{th}$ subcarrier of each symbol (not shown in FIG. 3A).

Figure 3B:
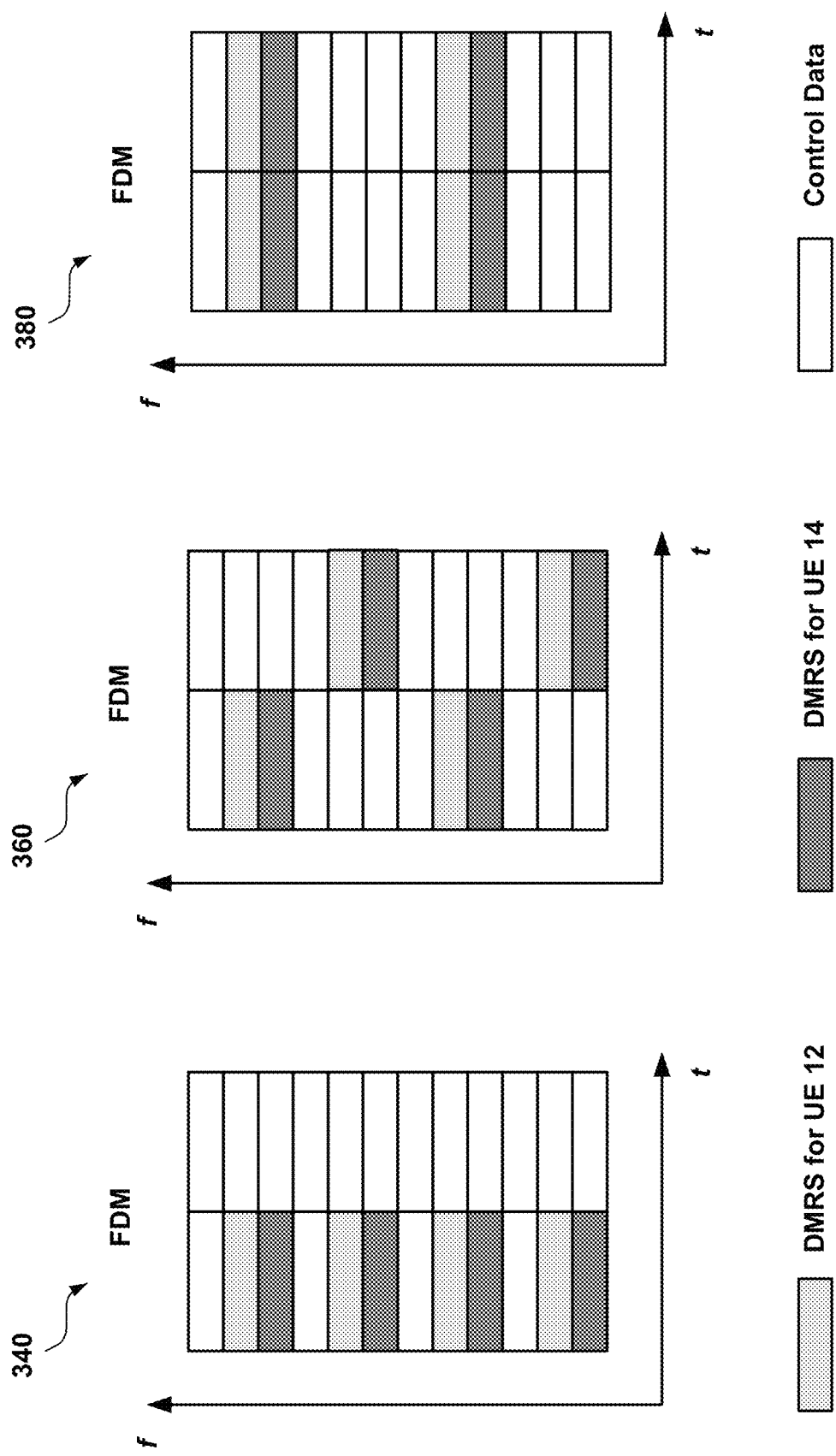
FIG. 3B illustrates three examples of orthogonal DMRSs using three different FDM schemes on a 2-symbol control channel, according to one or more of the presently described aspects.

Referring to FIG. 3B, in an aspect, a downlink control channel (e.g., a MU-MIMO downlink control channel) may use a multiplexing scheme 340, 360, or 380 (e.g., with different RS patterns) in a wireless communications system (e.g., the wireless communications system 100 in FIG. 1). In an example, two DMRSs, one for UE 12, and one for UE 14 may use FDM to achieve orthogonal DMRSs for a MU-MIMO downlink control channel. In particular, for example, the two orthogonal DMRSs may use different subcarriers within a same symbol, or may be present in different symbols. In an example, by using the multiplexing scheme 340, both the two orthogonal DMRSs (for UE 12 and UE 14) may be present in the first symbol of the multi-symbol downlink control channel, and all subcarriers of the second symbol may be used for control data or control information. In another example, using the multiplexing scheme 360 or 380, orthogonal DMRSs may be present in both the first symbol and the second symbol of the multi-symbol downlink control channel, as shown in FIG. 3B.

In some cases, the multiplexing scheme 340, 360, and/or 380 with FDM may have a same percentage of the signal overhead. For example, compared with orthogonal DMRSs for one-symbol downlink control channels, using the multiplexing scheme 340, 360, or 380 for orthogonal DMRSs for two-symbol downlink control channels, the overhead may be reduced from two third (or around 67%) to one third (or around 33%), assuming each orthogonal DMRS occupies one third (or around 33%) of the resource elements and two orthogonal DMRSs are used.

Figure 4:
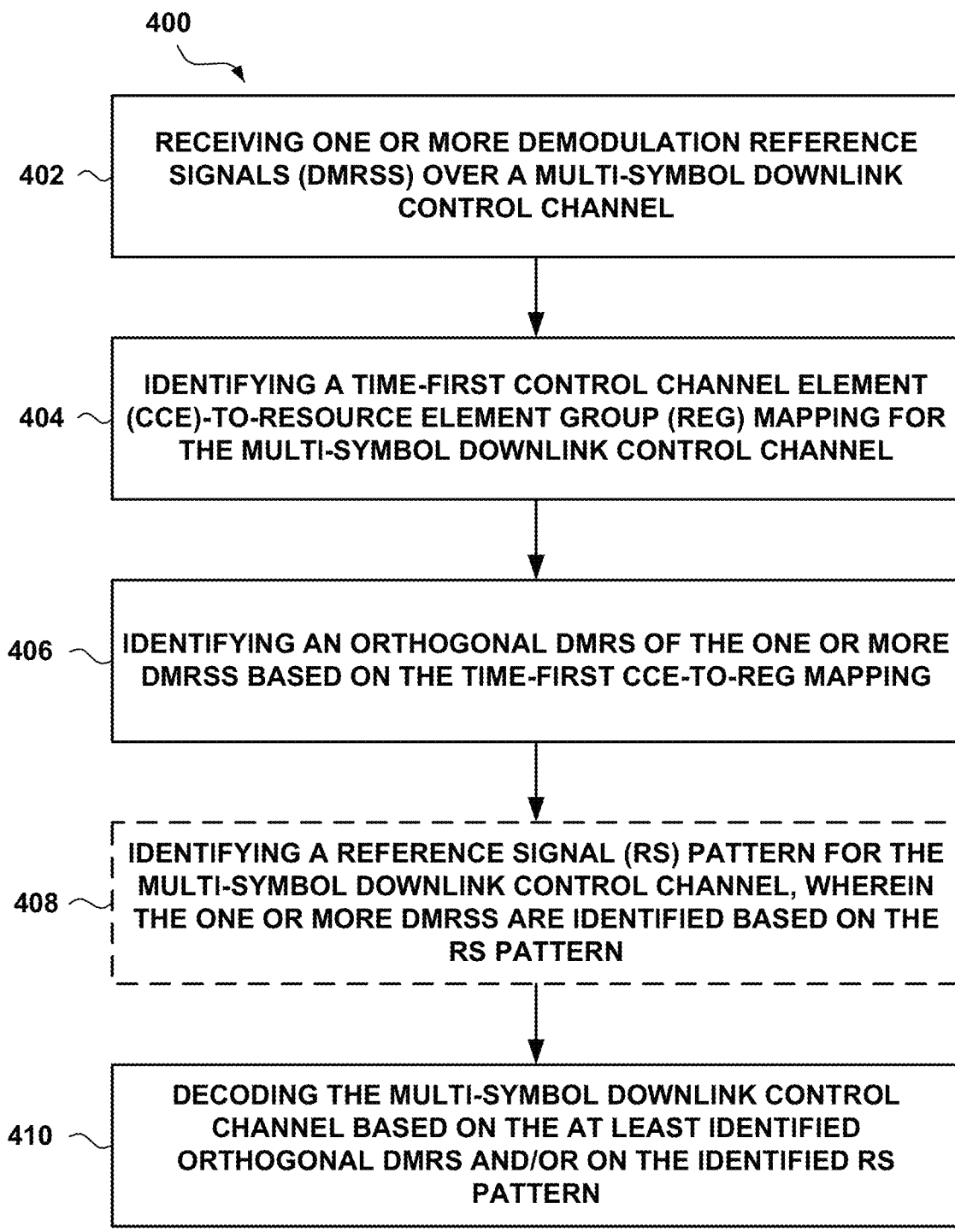
FIG. 4 is a flow chart of a first example method of using one or more orthogonal DMRSs for a downlink control channel, according to one or more of the presently described aspects.

Referring to FIG. 4, in an operational aspect, a UE, such as UE 12 or UE 14 (FIG. 1), may perform one or more aspects of a method 400 for using one or more DMRSs for downlink control channels in a wireless communications system (e.g., the wireless communications system 100). For example, one or more of the processors 103, the memory 130, the modem 108, the transceiver 106, the control channel management component 40, the DMRS component 42, the mapping component 44, and/or the RS pattern component 48 may be configured to perform aspects of the method 400.

In an aspect, at block 402, the method 400 may include receiving one or more DMRSs over a multi-symbol downlink control channel. In an aspect, for example, the control channel management component 40, and/or the DMRS component 42, e.g., in conjunction with one or more of the processors 103, the memory 130, the modem 108, and/or the transceiver 106, may be configured to receive, via the transceiver 106, one or more DMRSs over a multi-symbol downlink control channel.

In another aspect, at block 404, the method 400 may include identifying a time-first CCE-to-REG mapping for the multi-symbol downlink control channel. In an aspect, for example, the control channel management component 40, the DMRS component 42, and/or the mapping component 44, e.g., in conjunction with one or more of the processors 103, the memory 130, the modem 108, and/or the transceiver 106, may be configured to identify a time-first CCE-to-REG mapping for the multi-symbol downlink control channel. For example, if a multi-symbol CORESET is detected or determined by the control channel management component 40, a time-first CCE-to-REG mapping may be used and identified.

In an aspect, at block 406, the method 400 may include identifying an orthogonal DMRS of the one or more DMRSs based on the time-first CCE-to-REG mapping. In an aspect, for example, the control channel management component 40, the DMRS component 42, and/or the mapping component 44, e.g., in conjunction with one or more of the processors 103, the memory 130, the modem 108, and/or the transceiver 106, may be configured to identify an orthogonal DMRS of the one or more DMRSs based on the time-first CCE-to-REG mapping identified or determined at block 406, and/or based on the RS pattern identified or determined at block 404. For example, if a multi-symbol CORESET is determined and a time-first CCE-to-REG mapping is used or identified, an orthogonal DMRS (e.g., using CDM, TDM, or FDM) may be supported and used.

In an aspect, at block 408, the method 400 may optionally include identifying an RS pattern for the multi-symbol downlink control channel, wherein the one or more DMRSs are identified based on the RS pattern. In an aspect, for example, the control channel management component 40, and/or the RS pattern component 48, e.g., in conjunction with one or more of the processors 103, the memory 130, the modem 108, and/or the transceiver 106, may be configured to identify an RS pattern for the multi-symbol downlink control channel. In an example, the RS pattern may be configured or indicated by a network entity (e.g., the network entity 20) in a message over a downlink control channel. In some cases, the RS pattern may be used by the UE 12 or UE 14 to determine which subcarriers and/or symbols having DMRSs, and the DMRSs may be front-loaded (e.g., first symbol only), may be in every symbol, or in a subset of symbols of a downlink control channel.

In an aspect, at block 410, the method 400 may include decoding the multi-symbol downlink control channel based on the at least identified orthogonal DMRS and/or based on the identified RS pattern. In an aspect, for example, the control channel management component 40, the DMRS component 42 and/or the mapping component 44, e.g., in conjunction with one or more of the processors 103, the memory 130, the modem 108, and/or the transceiver 106, may be configured to decode the multi-symbol downlink control channel based on the at least identified orthogonal DMRS and/or based on the RS pattern identified or determined at block 408. In an aspect, a decoder can be used to decode the multi-symbol downlink control channel or the control channel management component 40, the DMRS component 42 and/or the mapping component 44 can form or be part of decoder for decoding the multi-symbol downlink control channel.

Figure 5:
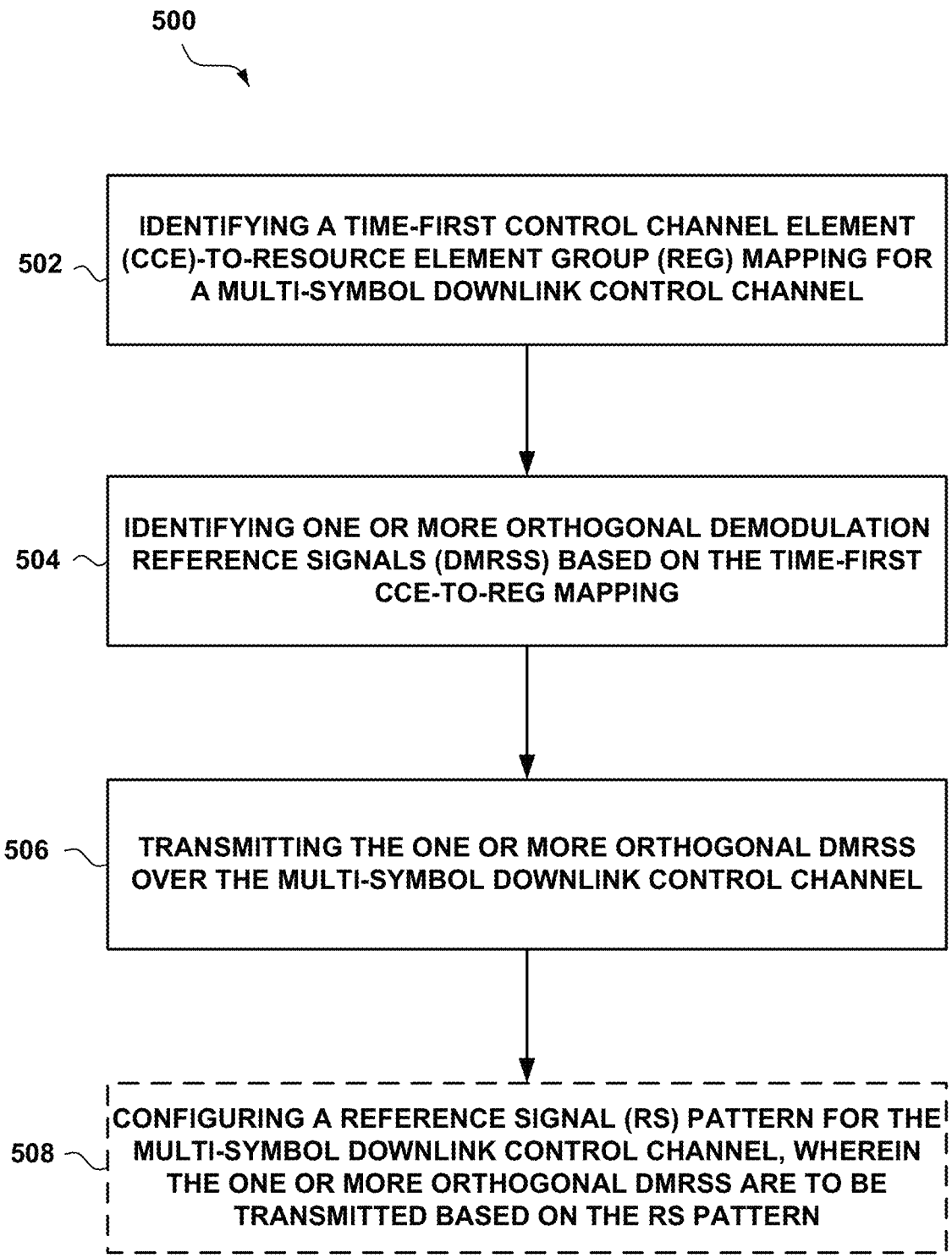
FIG. 5 is a flow chart of a second example method of using one or more orthogonal DMRSs for a downlink control channel, according to one or more of the presently described aspects.

Referring to FIG. 5, in an operational aspect, a network entity such as the network entity 20 (FIG. 1) may perform one or more aspects of a method 500 for using one or more DMRSs for downlink control channels in a wireless communications system (e.g., a 5G NR system). For example, one or more of the processors 103, the memory 130, the modem 108, the transceiver 106, the control channel management component 40, the DMRS component 42, the mapping component 44, and/or the RS pattern component 48, may be configured to perform aspects of the method 500.

In an aspect, at block 502, the method 500 may include identifying a time-first CCE-to-REG mapping for a multi-symbol downlink control channel. In an aspect, for example, the control channel management component 40, the DMRS component 42, and/or the mapping component 44, e.g., in conjunction with one or more of the processors 103, the memory 130, the modem 108, and/or the transceiver 106, may be configured to identify a time-first CCE-to-REG mapping for a multi-symbol downlink control channel. For example, if a multi-symbol CORESET is detected or determined by the control channel management component 40, a time-first CCE-to-REG mapping may be used and identified.

In an aspect, at block 504, the method 500 may include generating one or more orthogonal DMRSs based on the time-first CCE-to-REG mapping. In an aspect, for example, the control channel management component 40, the DMRS component 42, and/or the mapping component 44, e.g., in conjunction with one or more of the processors 103, the memory 130, the modem 108, and/or the transceiver 106, may be configured to generate one or more orthogonal DMRSs based on the time-first CCE-to-REG mapping identified at block 502. For example, if a multi-symbol CORESET is determined and a time-first CCE-to-REG mapping is used or identified, orthogonal DMRSs (e.g., using CDM, TDM, or FDM) may be supported and used.

In an aspect, at block 506, the method 500 may include transmitting the one or more orthogonal DMRSs over the multi-symbol downlink control channel. In an aspect, for example, the control channel management component 40, and/or the DMRS component 42, e.g., in conjunction with one or more of the processors 103, the memory 130, the modem 108, and/or the transceiver 106, may be configured to transmit, via the transceiver 106, the one or more orthogonal DMRSs over the multi-symbol downlink control channel. In an example, the one or more orthogonal DMRSs are transmitted based on the RS pattern configured at block 506.

In an aspect, at block 508, the method 500 may optionally include configuring an RS pattern for the multi-symbol downlink control channel, wherein the one or more orthogonal DMRSs are to be transmitted based on the RS pattern. In an aspect, for example, the control channel management component 40, and/or the RS pattern component 48, e.g., in conjunction with one or more of the processors 103, the memory 130, the modem 108, and/or the transceiver 106, may be configured to generate or identify an RS pattern for the multi-symbol downlink control channel. In an example, the RS pattern may be configured or indicated to a UE (e.g., the UE 12 or UE 14) in a message over a downlink control channel. In some cases, the RS pattern may indicate that which subcarriers and/or symbols include DMRSs, and the DMRSs may be front-loaded (e.g., first symbol only), may be in every symbol, or in a subset of symbols of a downlink control channel.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Several aspects of a telecommunications system have been presented with reference to an LTE/LTE-A or a 5G NR system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communications for a user equipment (UE), comprising:

receiving two orthogonal demodulation reference signals (DMRSs) over a multi-symbol downlink control channel;

identifying a time-first control channel element (CCE)-to-resource element group (REG) mapping for the multi-symbol downlink control channel;

identifying an orthogonal DMRS of the two orthogonal DMRSs based on the time-first CCE-to-REG mapping; and decoding the multi-symbol downlink control channel based on at least the identified orthogonal DMRS, and wherein the multi-symbol downlink control channel with the identified time-first CCE-to-REG mapping is a multi-user multiple-input multiple-output (MU-MIMO) downlink channel of at least three symbols in length, and wherein the two orthogonal DMRSs are supported and are present on the first two symbols of a Control Resource Set (CORESET) of the multi-symbol downlink control channel.

2. The method of claim 1, wherein the two orthogonal DMRSs are multiplexed by code division multiplexing (CDM).

3. The method of claim 1, wherein the two orthogonal DMRSs are included in multiple symbols on the multi-symbol downlink control channel.

4. The method of claim 1, wherein receiving the two orthogonal DMRSs comprises receiving, by the UE, the two orthogonal DMRSs from multiple panels or multiple transmission reception points (TRPs).

5. The method of claim 1, further comprising:
identifying a reference signal (RS) pattern for the multi-symbol downlink control channel, wherein the identified orthogonal DMRS is identified based on the RS pattern.

6. The method of claim 1, wherein the MU-MIMO downlink channel is a physical downlink control channel (PDCCH).

7. The method of claim 1, wherein at least one of the two orthogonal DMRSs is specifically for the UE and at least one other of the two orthogonal DMRSs is specifically for another UE.

8. A user equipment (UE) for wireless communications, comprising:
a receiver configured to receive signals;
a memory configured to store instructions; and
at least one processor coupled with the receiver and the memory, wherein the at least one processor is configured to execute the instructions to:
receive, via the receiver, two orthogonal demodulation reference signals (DMRSs) over a multi-symbol downlink control channel;
identify a time-first control channel element (CCE)-to-resource element group (REG) mapping for the multi-symbol downlink control channel;
identify an orthogonal DMRS of the two orthogonal DMRSs based on the time-first CCE-to-REG mapping; and
decode the multi-symbol downlink control channel based on at least the identified orthogonal DMRS, and
wherein the multi-symbol downlink control channel with the identified time-first CCE-to-REG mapping is a multi-user multiple-input multiple-output (MU-MIMO) downlink channel of at least three symbols in length, and
wherein the two orthogonal DMRSs are supported and are present on the first two symbols of a Control Resource Set (CORESET) of the multi-symbol downlink control channel.

9. The UE of claim 8, wherein the two orthogonal DMRSs are multiplexed by code division multiplexing (CDM).

10. The UE of claim 8, wherein the two orthogonal DMRSs are included in multiple symbols on the multi-symbol downlink control channel.

11. The UE of claim 8, wherein the at least one processor is configured to execute the instructions to receive, via the receiver, the two orthogonal DMRSs from multiple panels or multiple transmission reception points (TRPs).

12. The UE of claim 8, wherein the at least one processor is configured to execute the instructions to identify a reference signal (RS) pattern for the multi-symbol downlink control channel, wherein the identified orthogonal DMRS is identified based on the RS pattern.

13. The UE of claim 8, wherein at least one of the two orthogonal DMRSs is specifically for the UE and at least one other of the two orthogonal DMRSs is specifically for another UE.

14. A method of wireless communications, comprising:
identifying a time-first control channel element (CCE)-to-resource element group (REG) mapping for a multi-symbol downlink control channel;
generating two orthogonal demodulation reference signals (DMRSs) based on the time-first CCE-to-REG mapping; and
transmitting, to a user equipment (UE), the two orthogonal DMRSs over the multi-symbol downlink control channel, and
wherein the multi-symbol downlink control channel with the identified time-first CCE-to-REG mapping is a multi-user multiple-input multiple-output (MU-MIMO) downlink channel of at least three symbols in length, and
wherein the two orthogonal DMRSs are present on the first two symbols of a Control Resource Set (CORESET) of the multi-symbol downlink control channel.

15. The method of claim 14, wherein the two orthogonal DMRSs are multiplexed by code division multiplexing (CDM).

16. The method of claim 14, wherein the two orthogonal DMRSs are present on one symbol or multiple symbols on the multi-symbol downlink control channel.

17. The method of claim 14, wherein transmitting the two orthogonal DMRSs comprises transmitting the two orthogonal DMRSs from multiple panels or multiple transmission reception points (TRPs) to the UE.

18. The method of claim 14, further comprising:
configuring a reference signal (RS) pattern for the multi-symbol downlink control channel, wherein the two orthogonal DMRSs are transmitted based on the RS pattern.

19. The method of claim 14, wherein at least one of the two orthogonal DMRSs is specifically for the UE and at least one other of the two orthogonal DMRSs is specifically for another UE.

20. An apparatus for wireless communications, comprising:
a transmitter configured to transmit signals;
a memory configured to store instructions; and
at least one processor coupled with the transmitter and the memory, wherein the at least one processor is configured to execute the instructions to:

identify a time-first control channel element (CCE)-to-resource element group (REG) mapping for a multi-symbol downlink control channel;

generate two orthogonal demodulation reference signals (DMRSs) based on the time-first CCE-to-REG mapping; and transmit, to a user equipment (UE), the two orthogonal DMRSs over the multi-symbol downlink control channel, and wherein the multi-symbol downlink control channel with the identified time-first CCE-to-REG mapping is a multi-user multiple-input multiple-output (MU-MIMO) downlink channel of at least three symbols in length, and wherein the two orthogonal DMRSs are present on the first two symbols of a Control Resource Set (CORESET) of the multi-symbol downlink control channel.

21. The apparatus of claim 20, wherein the two orthogonal DMRSs are multiplexed by code division multiplexing (CDM).

22. The apparatus of claim 20, wherein transmit the two orthogonal DMRSs further comprises transmit the two orthogonal DMRSs from multiple panels or multiple transmission reception points (TRPs) to the UE.

23. The apparatus of claim 20, wherein the at least one processor is configured to execute the instructions to:
configure a reference signal (RS) pattern for the multi-symbol downlink control channel; and
transmit, via the transmitter, the two orthogonal DMRSs based on the RS pattern.

24. The apparatus of claim 20, wherein at least one of the two orthogonal DMRSs is specifically for the UE and at least one other of the two orthogonal DMRSs is specifically for another UE.

* * * * *